United States Patent
Donchev

(10) Patent No.: US 11,368,821 B2
(45) Date of Patent: Jun. 21, 2022

(54) SYSTEM AND METHOD FOR ONLINE CHARGING TELECOMMUNICATION SERVICES IN REAL TIME

(71) Applicant: Effortel Technologies, Watermael-Boitsfort (BE)

(72) Inventor: Emanuil Donchev, Watermael-Boitsfort (BE)

(73) Assignee: Effortel Technologies, Watermael-Boitsfort (BE)

(*) Notice: Subject to any disclaimer, the term of this patent is extended or adjusted under 35 U.S.C. 154(b) by 0 days.

(21) Appl. No.: 17/274,207

(22) PCT Filed: Sep. 7, 2018

(86) PCT No.: PCT/EP2018/074213
§ 371 (c)(1),
(2) Date: Mar. 8, 2021

(87) PCT Pub. No.: WO2020/048619
PCT Pub. Date: Mar. 12, 2020

(65) Prior Publication Data
US 2021/0314746 A1   Oct. 7, 2021

(51) Int. Cl.
*H04W 4/00* (2018.01)
*H04W 4/24* (2018.01)
(Continued)

(52) U.S. Cl.
CPC ............. *H04W 4/24* (2013.01); *H04M 15/41* (2013.01); *H04M 15/59* (2013.01); *H04M 15/64* (2013.01);
(Continued)

(58) Field of Classification Search
CPC ....... H04W 4/24; H04M 15/41; H04M 15/59; H04M 15/64; H04M 15/785; H04M 15/8228; H04M 15/852; H04M 15/888
See application file for complete search history.

(56) References Cited

U.S. PATENT DOCUMENTS 6,029,062 A    2/2000  Hanson
8,126,124 B2 * 2/2012  Cai ..................... H04L 12/1428
                                            379/114.1
(Continued)

FOREIGN PATENT DOCUMENTS

CA  2959550 A1 *  3/2016  ............ H04M 15/84
EP  2107464 A1   10/2009
EP  3145224 A1    3/2017

*Primary Examiner* — Pakee Fang
(74) *Attorney, Agent, or Firm* — N.V. Nederlandsch Octrooibureau

(57) ABSTRACT

Computer-implemented method for online charging telecommunication services in real time, comprising: (i) running a money-to-time algorithm, computing a time balance based on charging parameters and a wallet balance; (ii) if greater than zero, creating a charging data record, CDR, and writing a start timestamp therein, setting a terminate session timer based on the time balance, and confirming the communication session; (iii) if not greater than zero, or upon expiration of the terminate session timer, instructing to terminate the communication session, wherein upon expiration of the terminate session timer an end timestamp is written in the CDR. Online charging system, OCS, implementing the method.

13 Claims, 8 Drawing Sheets

(51) Int. Cl.
  *H04M 15/00* (2006.01)
  *H04M 15/02* (2006.01)
(52) U.S. Cl.
  CPC ..... *H04M 15/785* (2013.01); *H04M 15/8228* (2013.01); *H04M 15/852* (2013.01); *H04M 15/888* (2013.01)

(56) References Cited

U.S. PATENT DOCUMENTS

| | | |
|---|---|---|
| 9,900,444 B1 * | 2/2018 | Seetharaman .......... H04L 12/14 |
| 2009/0063315 A1 | 3/2009 | Cai |
| 2010/0304710 A1 | 12/2010 | Sharma et al. |
| 2014/0011472 A1 | 1/2014 | Sharma et al. |
| 2015/0244874 A1 * | 8/2015 | Tornkvist .......... H04M 15/8228 370/242 |

* cited by examiner

SYSTEM AND METHOD FOR ONLINE CHARGING TELECOMMUNICATION SERVICES IN REAL TIME

TECHNICAL FIELD

The present disclosure relates to a system and method for online charging in real time, preferably in a telecommunication network.

BACKGROUND ART

At present, the majority of communication services provided on mobile telecommunication networks have been mainly communication sessions, such as for example voice calls, and communication events, relating to wallet transaction services such as for example SMS, MIMS, mobile data sessions.

There are a variety of methods for providing a cost calculation for charging users of such communication services. A common method is online charging where, upon the purchase of e.g. a pre-paid communication service, a user is charged by a communication service provider based on various charging parameters.

In general, an online charging system (OCS) is set up in a telecommunication network where standard signalling protocol is used for communicating information in the telecommunication network. Moreover, the communication services are typically run in volatile memory, such as random access memory (RAM), of the telecommunication network.

The advent of an increase in the number of users of communication services has caused a strain on the standard signalling protocol to efficiently communicate large amounts of information in the telecommunication network. This has often resulted in inaccurate charging. An example of this is when the duration of a communication session displayed to a user in real time is either longer or shorter than the charged duration in the database of the communication service provider. In the former case, this may result in financial losses to the communication service provider. In the latter case, this may result in user dissatisfaction.

Moreover, the ever increasing simultaneous use of the various communication services by a user has complicated the charging methods and added further strain on the resources of the telecommunication network.

One approach for solving this problem has been to expand and/or upgrade the OCS in order to cope with the increasing demand of the network resources. However, this approach has several limitations, particularly putting a great financial burden on the communication service provider. Another limitation is the possibility of glitches and/or crashes occurring when a processing module is overloaded, and, thus resulting in loss of communicated information. This may cause inaccurate charging of communication services and may result in user dissatisfaction and/or financial losses to the communication service provider.

SUMMARY OF THE DISCLOSURE

Therefore, it is an object of the disclosure to provide an online charging system and method which does not show one or more of the above mentioned disadvantages.

It may be an object of the disclosure to prevent inaccurate charging of a communication service.

An aspect of the present disclosure provides a computer-implemented method for online charging telecommunication services in real time, comprising the step of, upon establishment of a communication session on a telecommunication network, gathering first charging parameters for the communication session and a wallet balance of a respective user. The communication session may be, but is not limited to, voice calls.

The method further comprises the steps of running a money-to-time algorithm, which comprises computing a time balance for the communication session based on the first charging parameters and the wallet balance; determining whether the time balance is greater than zero; upon determining that the time balance is greater than zero, creating a charging data record (CDR) and writing a start timestamp therein, setting a terminate session timer based on the time balance, and confirming to the telecommunication network that the communication session may take place; and upon determining that the time balance is not greater than zero, or upon expiration of the terminate session timer, instructing the telecommunication network to terminate the communication session, wherein upon expiration of the terminate session timer an end timestamp is written in the CDR.

The termination session timer can exist independently from other processes in the telecommunication network. As a result, any interferences with the termination session timer can be reduced. Therefore, the method allows for accurate online charging of a communication service in real time.

The terminate session timer provides the time remaining rather than an elapsed time in a communication session. As a result, there is no need for continuous communication of information through the standard signalling protocol to determine the status of a communication session in the telecommunication network. This can effectively reduce the amount of information communicated in the telecommunication network. Advantageously, the method for online charging in real time may be used to increase the speed of communicating information during a communication service. For example, communication and processing modules may be used less frequently to communicate information of a communication service which increases the efficiency of the communication service taking place, and also lowers the information traffic on the standard signalling protocol.

Furthermore, since the method allows for reducing the frequency of communicated information, the method may, apart from using versatile memory, also use disk, flash or persistent memory without affecting the efficiency of a communication service taking place. Advantageously, the use of disk, flash or persistent memory of the telecommunication network, may reduce the risk of losing any communicated information. For example, the reliability of disk, flash or persistent may prevent loss of communication information or communication event due to any occurrence of a glitch or crash caused by an overload of a processing module or any other reason, and may reduce maintenance cost, such as down time cost.

According to an embodiment, the method may further comprise communicating information to the telecommunication network for displaying the terminate session timer to the respective user. Advantageously, the method allows for real time display of time remaining for a communication service, and, thus, improve user satisfaction.

According to a further embodiment, the method may further comprise the step of, upon receipt of information from the telecommunication network that the communication session has been terminated, removing the terminate session timer and writing an end timestamp in the CDR based on the time lapsed on the terminate session timer.

Thereby, the method allows for reducing the number of terminate session timers that are not needed.

According to an embodiment, the method may further comprise the steps of, upon an increase or decrease of the wallet balance, determining whether there is for the respective user an unconcluded CDR which does not contain an end timestamp; upon determining that there is an unconcluded CDR for the respective user, running the money-to-time algorithm based on the first charging parameters and the increased or decreased wallet balance and updating the terminate session timer accordingly. Thereby, accurately updating the wallet balance and the remaining time in a communication session.

As used herein, the term "unconcluded CDR" refers to a created CDR that contains a start timestamp but not an end timestamp.

According to a further embodiment, the method may further comprise the steps of, upon establishment of a communication event relating to the respective user, gathering the communication event charge and the wallet balance of the respective user; determining whether there is for the respective user an unconcluded CDR which does not contain an end timestamp; upon determining that there is for the respective user an unconcluded CDR, determining whether the communication event may take place based on the wallet balance, the communication event charge and a current cost of the communication session corresponding to the unconcluded CDR.

According to an even further embodiment, the method may further comprise the steps of setting "now" (i.e. the present time) as a preliminary end timestamp in the unconcluded CDR; running a time-to-money algorithm to calculate the current cost based on the start timestamp and the preliminary end timestamp in the unconcluded CDR and the first charging parameters; and comparing the communication event charge with the current wallet balance, which is the wallet balance minus the current cost. Thereby, the method allows for accurately charging a communication event while a communication session is taking place.

According to another embodiment, the method may further comprise the steps of, upon changing from the first charging parameters to second charging parameters, determining whether there is for the respective user an unconcluded CDR which does not contain an end timestamp; upon determining that there is an unconcluded CDR for the respective user, setting "now" as a preliminary end timestamp in the unconcluded CDR; running a time-to-money algorithm to calculate a current cost based on the start timestamp, the preliminary end timestamp in the unconcluded CDR and the first charging parameters and decreasing the wallet balance by subtracting the calculated current cost; and running the money-to-time algorithm based on the decreased wallet balance and the second charging parameters and updating the terminate session timer accordingly. Advantageously, the method allows for a relatively quick change of charging parameters while a communication session is taking place and allows the communication service provider to ensure that all communication services are charged using up-to-date charging parameters and wallet balance.

An aspect of the present disclosure also provides an online charging system (OCS) for online charging telecommunication services in real time, configured for performing the method.

The system comprises a communication module configured to communicate with a telecommunication network and a processing module configured to, upon establishment of a communication session on the telecommunication network, gather first charging parameters for the communication session and a wallet balance of a respective user.

The processing module in the system is further configured to run a money-to-time algorithm, which comprises computing a time balance for the communication session based on the first charging parameters and the wallet balance; determine whether the time balance is greater than zero; upon determining that the time balance is greater than zero, create a charging data record, CDR, in a memory module and write a first start timestamp therein, set a terminate session timer based on the time balance, and confirm to the telecommunication network that the communication session may take place; and, upon determining that the time balance is not greater than zero, or upon expiration of the terminate session timer, instruct the telecommunication network to terminate the communication session, wherein upon expiration of the terminate session timer an end timestamp is written in the CDR.

In embodiments, the communication module may be further configured to communicate information to the telecommunication network for displaying the terminate session timer to the respective user.

In embodiments, the processing module may be further configured to, upon receipt of information from the telecommunication network that the communication session has been terminated, remove the terminate session timer and write an end timestamp in the CDR based on the time lapsed on the terminate session timer.

In embodiments, the processing module may be further configured to, upon an increase or decrease of the wallet balance, determine whether there is for the respective user an unconcluded CDR which does not contain an end timestamp; and, upon determining that there is an unconcluded CDR for the respective user, run the money-to-time algorithm based on the first charging parameters and the increased or decreased wallet balance and update the terminate session timer accordingly.

In embodiments, the processing module may be further configured to, upon establishment of a communication event relating to the respective user, gather the communication event charge and the wallet balance of the respective user; determine whether there is for the respective user an unconcluded CDR which does not contain an end timestamp; and, upon determining that there is for the respective user an unconcluded CDR, determine whether the communication event may take place based on the wallet balance, the communication event charge and a current cost of the communication session corresponding to the unconcluded CDR.

In embodiments, the processing module, upon determining whether the communication event may take place based on the wallet balance, may be further configured to set "now" (i.e. the present time) as a preliminary end timestamp in the unconcluded CDR; run a time-to-money algorithm to calculate the current cost based on the start timestamp, the preliminary end timestamp in the unconcluded CDR and the first charging parameters; and compare the communication event charge with the current wallet balance, which is the wallet balance minus the current cost.

In embodiments, the processing module may be further configured to, upon changing from the first charging parameters to second charging parameters, determine whether there is for the respective user an unconcluded CDR which does not contain an end timestamp; upon determining that there is an unconcluded CDR for the respective user, set "now" as a preliminary end timestamp in the unconcluded CDR; run a time-to-money algorithm to calculate a current cost based on the start timestamp, the preliminary end timestamp in the unconcluded CDR and the first charging parameters and decrease the wallet balance by subtracting the calculated current cost; and run the money-to-time algorithm based on the decreased wallet balance and the second charging parameters and update the terminate session timer accordingly.

BRIEF DESCRIPTION OF THE DRAWINGS

The present disclosure will be discussed in more detail below, with reference to the attached drawings, in which.

DESCRIPTION OF EMBODIMENTS

The following descriptions depict only example embodiments and are not considered limiting in scope. Any reference herein to the disclosure is not intended to restrict or limit the disclosure to exact features of any one or more of the exemplary embodiments disclosed in the present specification.

Furthermore, the terms first, second, third and the like in the description and in the claims are used for distinguishing between similar elements and not necessarily for describing a sequential or chronological order. The terms are interchangeable under appropriate circumstances and the embodiments of the invention can operate in other sequences than described or illustrated herein.

Figure 7:
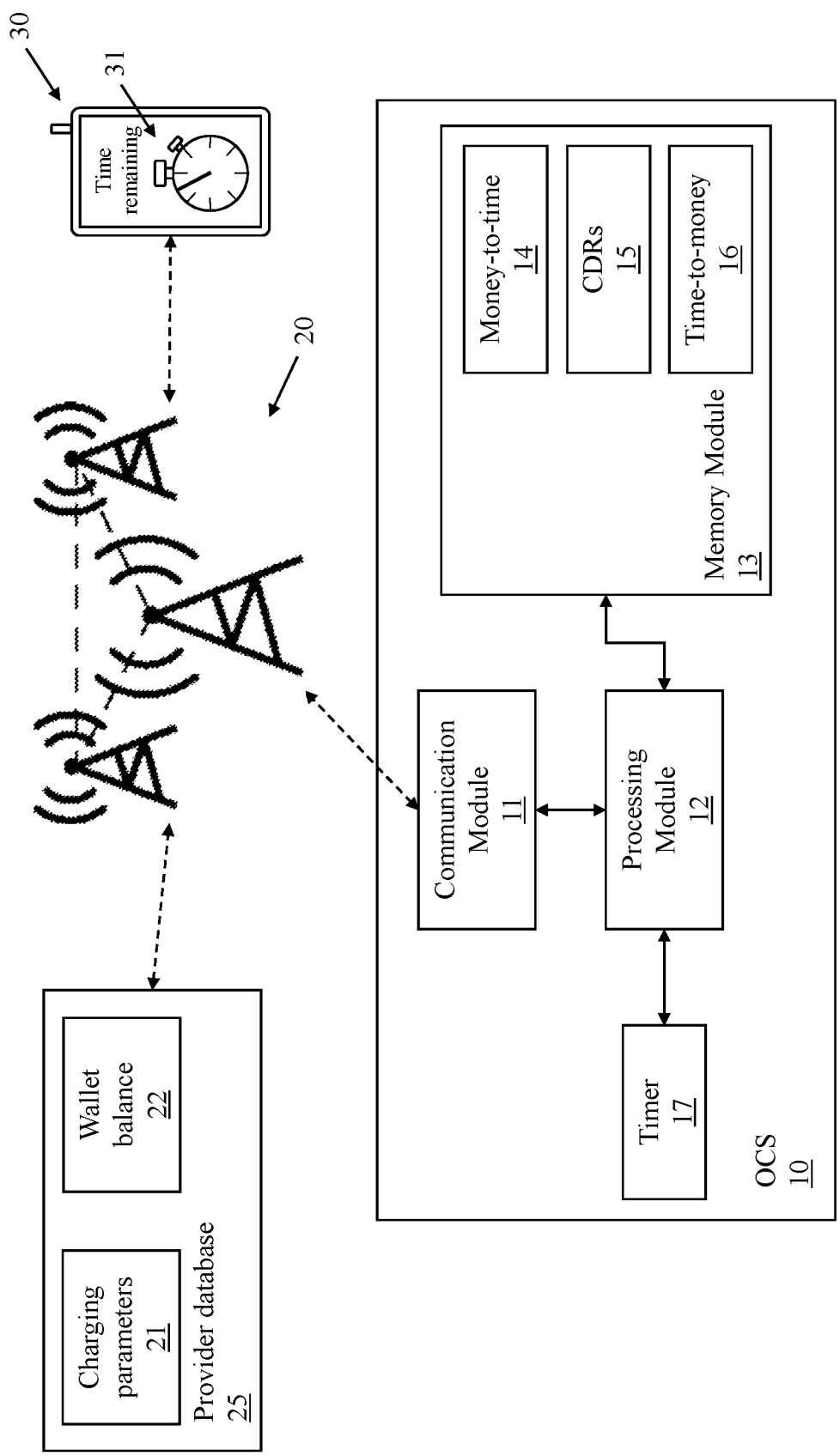
FIG. 7 depicts a schematic diagram illustrating an online charging system (OCS).

A first embodiment of an online charging system (OCS) and method for online charging telecommunication services in real time according to the disclosure will be described with reference to FIG. 7. The OCS 10 comprises a communication module 11 configured to communicate with a telecommunication network 20, a processing module 12 and at least one memory module 13, in the form of RAM and/or ROM, for storing data and/or algorithms to be executed by the processing module 12.

The (mobile) telecommunications network 20 and user's equipment or device 30 are known in the art and will therefore not be described herein in great detail.

The processing module 12 of the OCS 10 is configured to, upon establishment of a communication session on the network 20 involving a user 30 to whom the session is to be charged, gather currently applicable charging parameters 21 (e.g. a tariff plan) and a wallet balance 22 of the respective user 30. The parameters 21 and wallet balance 22 are used to determine if the user has enough balance to allow the communication session and if so, for how long the session may go on. In the embodiment shown, the charging parameters 21 and wallet balance 22 are gathered from a database 25 of the network provider, but in alternative embodiments this information may also be stored within the OCS.

In particular, the processing module 12 is configured to run a money-to-time algorithm 14, which comprises computing a time balance for the communication session based on the currently applicable charging parameters 21 and the wallet balance 22, and determine whether the calculated time balance is greater than zero. Upon determining that the time balance is greater than zero, the processing module creates a charging data record 15, CDR, in the memory module 13 and writes a first start timestamp therein, sets a terminate session timer 17 based on the calculated time balance 23, and confirms to the telecommunication network 20 that the communication session may take place. Upon determining that the time balance is not greater than zero, or upon expiration of the terminate session timer 30, the processing module instructs the telecommunication network 20 to terminate the communication session. If the termination results from expiration of the terminate session timer, an end timestamp is written in the CDR 15, so the CDR becomes a completed record.

The CDR may comprise information on chargeable communication services relevant to source and destination identification (e.g. user ID, device ID, account ID, and/or telephone number), communication service identification (e.g. voice, internet, SMS, MIMS, etc.), start and end timestamp (e.g. date and time) and duration (e.g. in milliseconds, seconds, minutes and/or hours) of a communication session, completion status of a communication service, amount of data transferred (in kilobytes, megabytes, and/or gigabytes), amount of usage units (e.g. user downloaded 1 movie), etc. The CDR may also be called a "(dial) call detail record" or referred to as a "usage detail record (UDR)".

The charging parameters may comprise information to define rules of charging based on time or day (e.g. daytime, peak time, off peak time, weekend, weekday etc.), source and destination network (e.g. on-net, off-net, international, national, closed user group, etc.), promotion (e.g. festival, bundle, etc.), charging rates, or charging units (e.g. charging rates per milliseconds, seconds, minutes, etc.) of a communication service.

Figure 8:
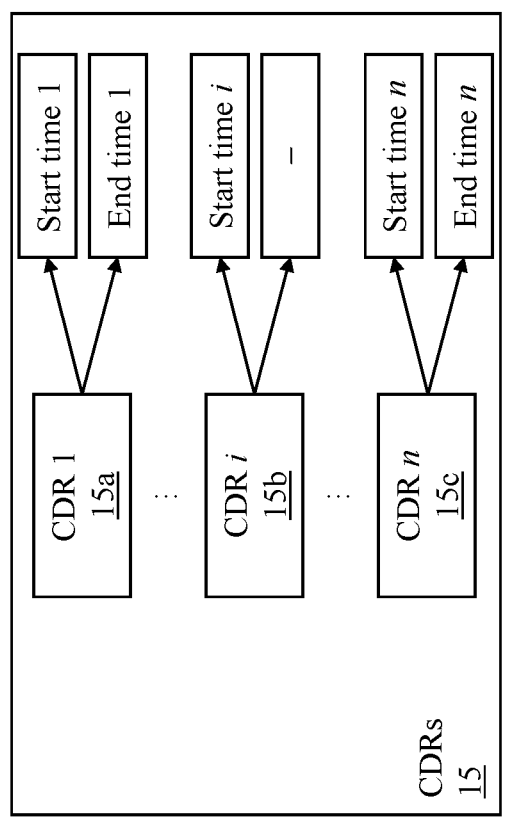
FIG. 8 depicts a schematic diagram illustrating charging data.

FIG. 8 shows a detail of a part of the memory module 13, where the CDRs are stored. Shown are a number of CDRs 15a, 15b, 15c, each comprising a field for entering a start time stamp and an end time stamp (along with other fields identifying the user etc., which are not shown). As shown, for at least one CDR 15b, the start time field may be written while the end time field may be still empty. According to the present disclosure, such a CDR is termed an uncompleted CDR, reflecting an ongoing or not yet terminated communication session. So the OCS is able to determine if there is for a respective user an ongoing communication session by a simple lookup in its memory module 13, without interaction with the network provider.

The communication module 11 may be further configured to communicate information to the telecommunication network 20, which may in turn communicate this information further to the user device 30 for displaying the terminate session timer 17 in real-time to the respective user. This may take the form of displaying the remaining session time on a display of the user's mobile device, for example in a telecommunications app 31 running on said device, or in a separate app, e.g. an app configured for displaying user account information, the user's wallet balance etc., or in another way.

With reference to FIGS. 1-6, embodiments of algorithms executed by the processing module 12 of the OCS 10 will now be described.

Figure 1:
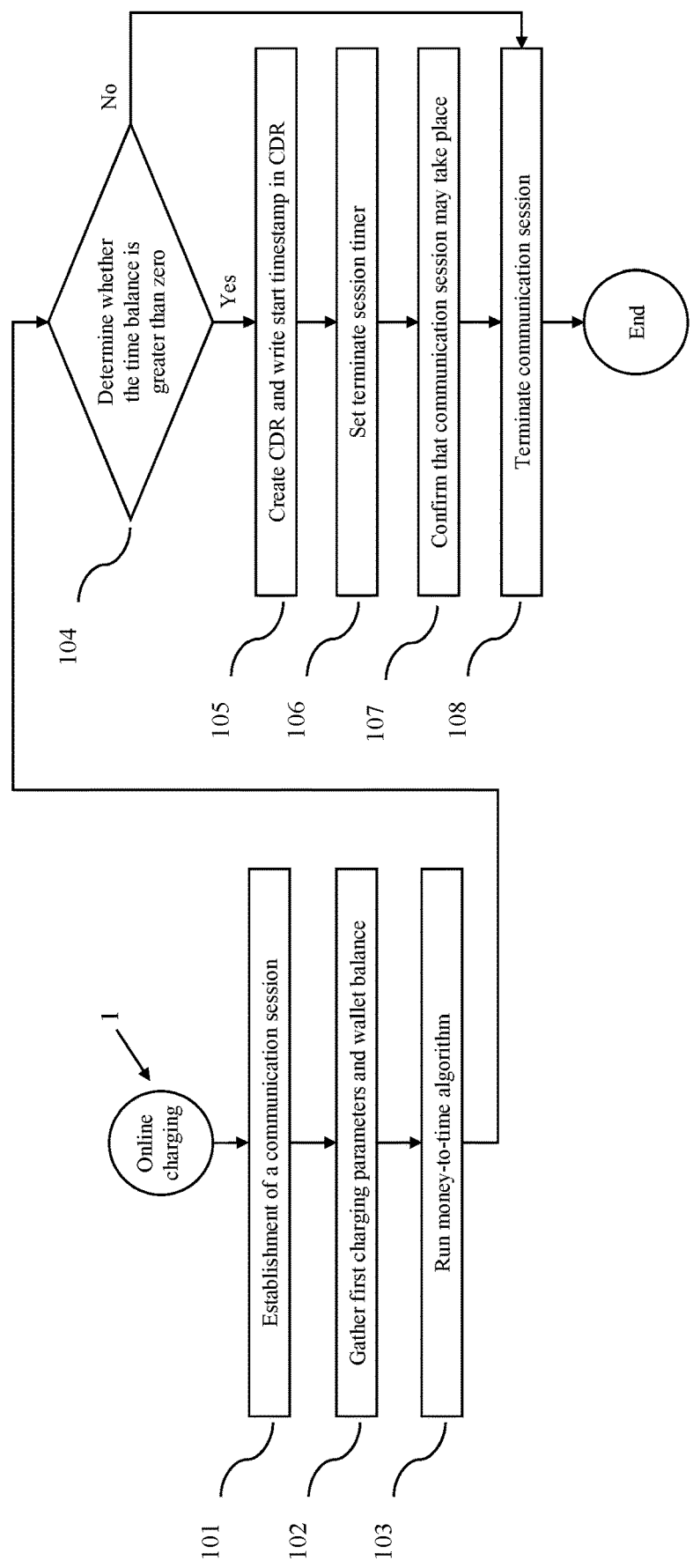
FIG. 1 depicts a flowchart illustrating an embodiment of a method for online charging of a communication session, according to the present disclosure.

An embodiment of the algorithm 1 for starting a communication session and online charging the communication session in real time according to the disclosure will be described with reference to FIG. 1. In step 101, the processing module 12 receives a notice from the network 20 of establishment of a communication session for a user 30. In step 102, the processing module 12 gathers currently applicable charging parameters 21 for the communication session and a wallet balance 22 of the respective user 30. The communication session may be, but is not limited to, voice calls. Step 103 comprises running a money-to-time algorithm 103, which comprises computing a time balance for the communication session based on the currently applicable charging parameters 21 and the wallet balance 22. In step 104, the processing module 12 determines whether the time balance is greater than zero. In step 105, upon determining that the time balance is greater than zero, the processing module 20 creates a CDR 15 in the memory module 13 and writes a start timestamp in the CDR. In step 106, the processing module 12 starts a terminate session timer 17 based on the time balance calculated in step 103, and in step 107 the processing module 12 confirms to the telecommunication network 12 that the communication session may take place. Once the timer 17 expires, the processing module 12 moves to step 108 to instruct the network 20 to terminate the session. If in step 104 it is determined that the time balance is not greater than zero, the processing module 12 moves immediately to step 108 to instruct the network 20 to terminate the session.

Figure 2:
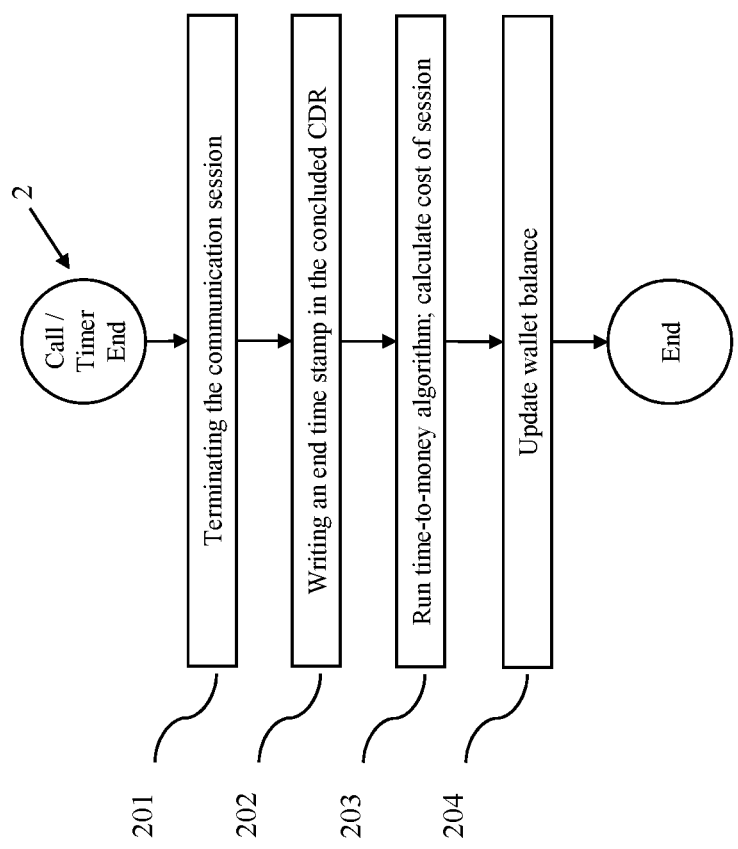
FIG. 2 depicts a flowchart illustrating a method for terminating charging of a communication session.

FIG. 2 shows an embodiment of an algorithm 2 for handling the end or termination of a communication session. In step 201, the session is terminated, which can be as a result of a expiration of the timer 17 or a termination from network side (e.g. when the user hangs up or the connection is lost), in which case the processing module 12 receives a notice that the session is terminated. In step 202, an end timestamp is written in the CDR 15. In step 203, the processing module 12 runs a time-to-money algorithm 16, which comprises computing a cost of the session based on the start timestamp, the end timestamp and the currently applicable charging parameters. In step 204, the wallet balance 23 is updated, which may happen within the OCS 10 or in the network database 25.

Figure 3:
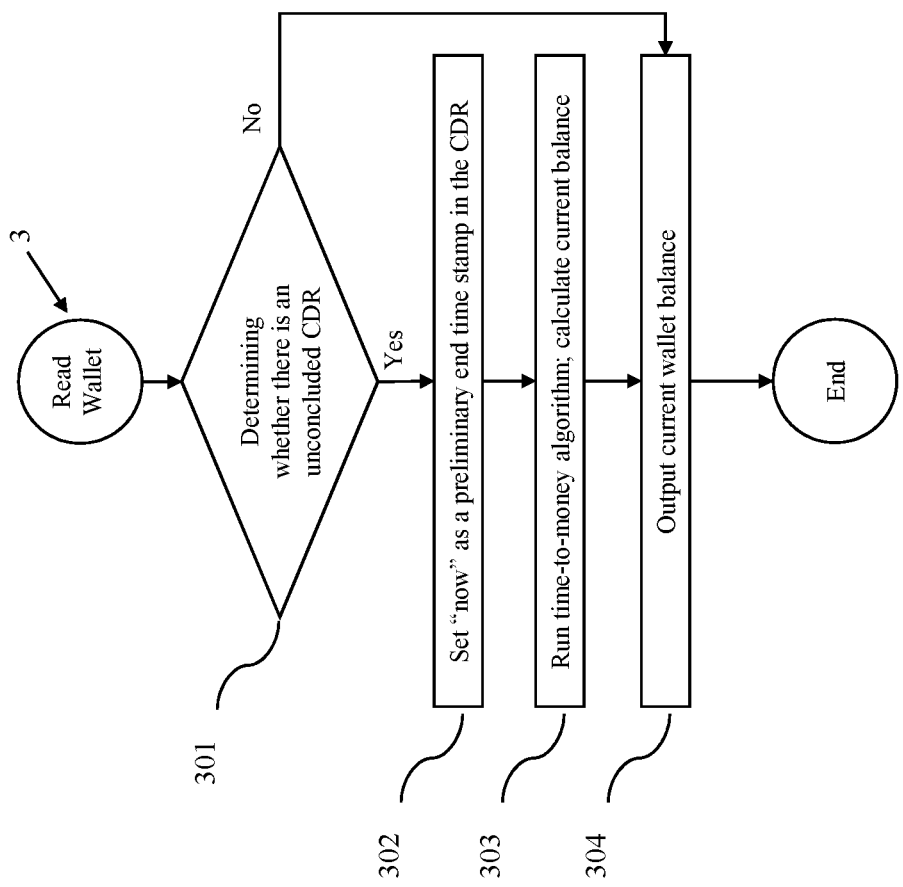
FIG. 3 depicts a flowchart illustrating a method for reading a wallet balance.

FIG. 3 shows an algorithm 3 for reading or consulting a wallet balance of a respective user, possibly while a communication session is taking place. In step 301, the processing module 12 determines whether there is for the respective user an unconcluded CDR 15b (see FIG. 8) which does not contain an end timestamp, which is an indication that a communication session is ongoing for the respective user 30. If so, the processing module 12 moves to step 302 and sets "now" as a preliminary end timestamp in the unconcluded CDR 15b. In step 303, the processing module 12 runs the time-to-money algorithm 16 to calculate the current cost of the ongoing session based on the start timestamp, the preliminary end timestamp in the unconcluded CDR 15b and the currently applicable charging parameters, and to calculate a current balance which is the difference between the wallet balance stored and the calculated current cost. In step 304, the current wallet balance is outputted to the network 20. If in step 301 it is determined that there is no unconcluded CDR, this means there is no ongoing communication session for the respective user and the processing module 12 immediately moves to step 304 to output the wallet balance.

Figure 4:
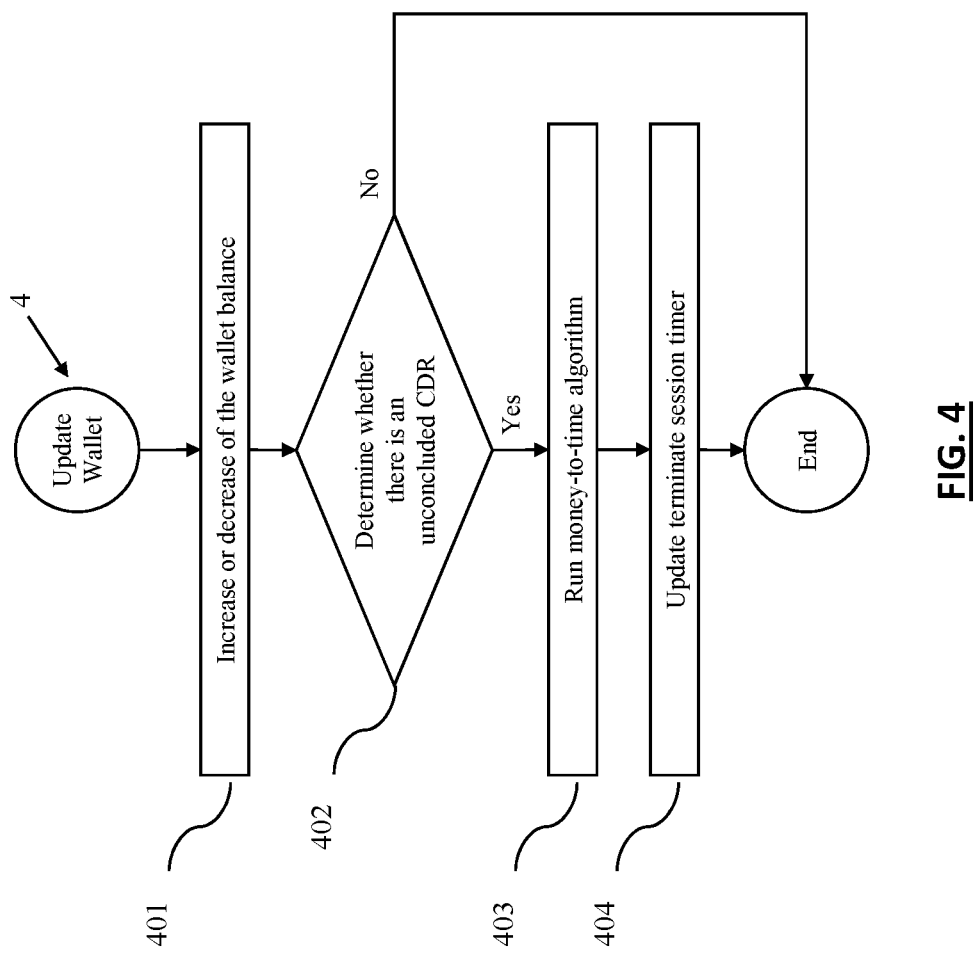
FIG. 4 depicts a flowchart illustrating a method for updating a wallet balance.

FIG. 4 shows an embodiment of an algorithm 4 for handling an update of a wallet balance of a respective user, possibly while a communication session is taking place. In step 401, the processing module 12 receives notice, for example from the network 20, of an increase or decrease of the wallet balance 22. In step 402, the processing module determines whether there is for the respective user 30 an unconcluded CDR 15b (see FIG. 8) which does not contain an end timestamp. If so, the processing module 12 moves to step 403 and runs the money-to-time algorithm 14 based on the currently applicable charging parameters and the increased or decreased wallet balance and updates the terminate session timer 17 accordingly in step 404. If in step 402 it is determined that there is no unconcluded CDR, this means there is no ongoing communication session for the respective user and no further steps need to be taken.

Figure 5:
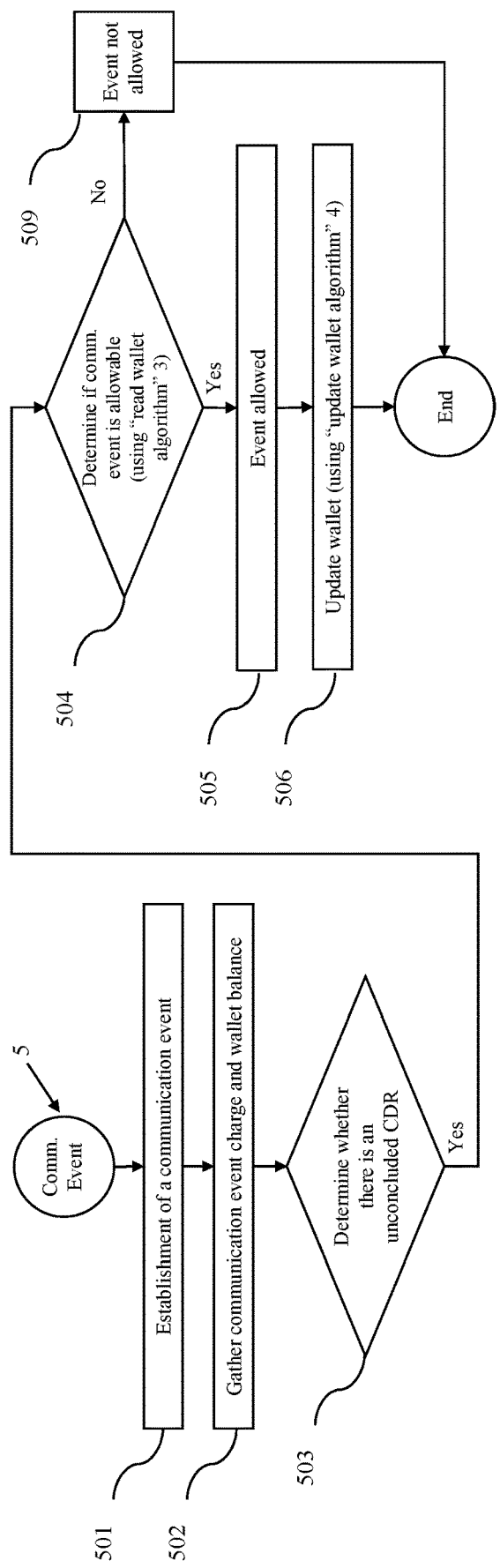
FIG. 5 depicts a flowchart illustrating a method for online charging of a communication event.

FIG. 5 shows an embodiment of an algorithm 5 for handling a communication event, like an SMS or MIMS, possibly while a communication session is taking place. In step 501, the processing module 12 is notified of establishment of a communication event 501 relating to the respective user. In step 502, the processing module 12 gathers the communication event charge and the wallet balance 22 of the respective user. In step 503, the processing module 12 determines whether there is for the respective user an unconcluded CDR 15b (see FIG. 8) which does not contain an end timestamp. If so, the processing module 12 moves to step 504 to determine whether the communication event may take place (if not, the handling of the communication event is simply allowed or not based on whether there is enough wallet balance, which is not further detailed herein). The decision in step 504 is based on the current wallet balance, the communication event charge and a current cost of the ongoing communication session corresponding to the unconcluded CDR, with the current wallet balance for example being calculated using the read wallet algorithm 3 of FIG. 3. If the communication event charge is higher than the current wallet balance, the communication event is not allowed and the processing module 12 informs the network 20 accordingly (step 509). If there is enough wallet balance, the event is allowed and the processing module 12 informs the network 20 accordingly (step 505) and then the wallet balance needs to be updated, which may be done using the update wallet algorithm 4 of FIG. 4. This will result in an update of the terminate session timer 17.

Figure 6:
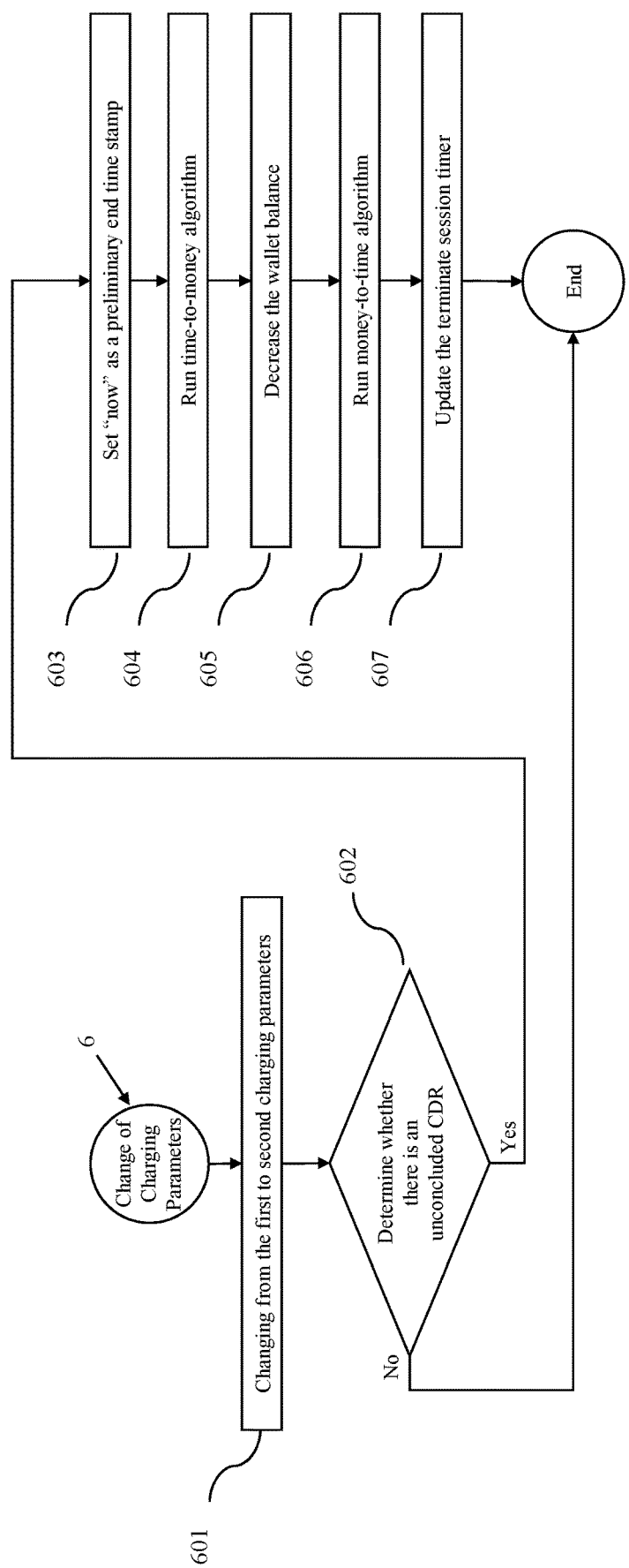
FIG. 6 depicts a flowchart illustrating a method for changing charging parameters of a communication session.

FIG. 6 shows an embodiment of an algorithm 6 for handling a change of charging parameters, possibly while a communication session is taking place. In step 601, the processing module 12 is notified of a change from first charging parameters to second charging parameters. This can involve a change in tariff applicable for the respective user as from a certain point in time, the user roaming from one tariff zone to another, and the like. In step 602, the processing module determines, at the point in time when the change needs to occur, whether there is for the respective user an unconcluded CDR 15b (see FIG. 8) which does not contain an end timestamp and thus indicates that there is an ongoing session. If so, the next steps are step 603 to set "now" as a preliminary end timestamp in the unconcluded CDR; step 604 to run the time-to-money algorithm 16 to calculate a current cost of the ongoing session based on the start timestamp, the preliminary end timestamp in the unconcluded CDR and the first charging parameters; step 605 to decrease the wallet balance by subtracting the calculated current cost; step 606 to run the money-to-time algorithm 14 based on the decreased wallet balance and the second charging parameters and step 607 to update the terminate session timer 17 accordingly. If there is no unconcluded CDR found in step 602, this means there is no ongoing session for the respective user and there are no further steps to be taken.

In embodiments, two or more communication sessions involving one or more common users may be handled simultaneously by performing the method as defined herein before in parallel for each communication session. This can involve adding one or more communication sessions while a first communication session is taking place, or merging two or more communication sessions. This is referred to hereon in as a conference communication session (e.g. conference call). In embodiments, a user involved in a conference communication session may be charged based on charging parameters applicable to the conference communication session and/or to each communication session taking place in which a user is involved. In embodiments, a user requesting a conference communication session may be charged based on charging parameters applicable to the conference communication session and/or to each communication session taking place.

In embodiments, a non-transient computer readable medium containing a computer executable software which when executed on a computer system performs the method as defined herein before by the embodiments of the present disclosure. A non-transient computer readable medium may include an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a non-transient computer readable medium may be any tangible medium that can contain, or store a program for use by or in connection with an instruction execution system, apparatus, device or module.

The invention claimed is:

1. A computer-implemented method for online charging telecommunication services in real time, comprising the step of, upon establishment of a communication session on a telecommunication network, gathering first charging parameters for the communication session and a wallet balance of a respective user;
the method further comprising the steps of:
running a money-to-time algorithm, which comprises computing a time balance for the communication session based on the first charging parameters and the wallet balance;
determining whether the time balance is greater than zero;
upon determining that the time balance is greater than zero, creating a charging data record, CDR, and writing a start timestamp therein, setting a terminate session timer based on the time balance, and confirming to the telecommunication network that the communication session may take place;
upon determining that the time balance is not greater than zero, or upon expiration of the terminate session timer, instructing the telecommunication network to terminate the communication session, wherein upon expiration of the terminate session timer an end timestamp is written in the CDR; and further comprising the steps of:
upon changing from the first charging parameters to second charging parameters, determining whether there is for the respective user an unconcluded CDR which does not contain an end timestamp;
upon determining that there is an unconcluded CDR for the respective user, setting "now" as a preliminary end timestamp in the unconcluded CDR;
running a time-to-money algorithm to calculate a current cost based on the start timestamp and the preliminary end timestamp in the unconcluded CDR and decreasing the wallet balance by subtracting the calculated current cost; and
running the money-to-time algorithm based on the decreased wallet balance and the second charging parameters and updating the terminate session timer accordingly.

2. The method according to claim 1, further comprising communicating information to the telecommunication network for displaying the terminate session timer to the respective user.

3. The method according to claim 1, further comprising the step of, upon receipt of information from the telecommunication network that the communication session has been terminated, removing the terminate session timer and writing an end timestamp in the CDR corresponding to the time lapsed on the terminate session timer.

4. The method according to claim 1, further comprising the steps of:
upon an increase or decrease of the wallet balance, determining whether there is for the respective user an unconcluded CDR which does not contain an end timestamp; and
upon determining that there is an unconcluded CDR for the respective user, running the money-to-time algorithm based on the increased or decreased wallet balance and updating the terminate session timer accordingly.

5. The method according to claim 1, further comprising the steps of:
upon establishment of a communication event relating to the respective user, gathering the communication event charge and the wallet balance of the respective user;
determining whether there is for the respective user an unconcluded CDR which does not contain an end timestamp; and
upon determining that there is for the respective user an unconcluded CDR, determining whether the communication event may take place, based on the wallet balance, the communication event charge and a current cost of the communication session corresponding to the unconcluded CDR.

6. The method according to claim 5, wherein step 5c further comprises:
setting "now" as a preliminary end timestamp in the unconcluded CDR;
running a time-to-money algorithm to calculate the current cost based on the start timestamp and the preliminary end timestamp in the unconcluded CDR and the first charging parameters; and
comparing the communication event charge with the wallet balance minus the current cost.

7. An online charging system, OCS, for online charging telecommunication services in real time, comprising a communication module configured to communicate with a telecommunication network and a processing module configured to, upon establishment of a communication session on the telecommunication network, gather first charging parameters for the communication session and a wallet balance of a respective user;
wherein the processing module is further configured to perform the following steps:

run a money-to-time algorithm, which comprises computing a time balance for the communication session based on the first charging parameters and the wallet balance;

determine whether the time balance is greater than zero;

upon determining that the time balance is greater than zero, create a charging data record, CDR, in a memory module and write a first start timestamp therein, set a terminate session timer based on the time balance, and confirm to the telecommunication network that the communication session may take place; and upon determining that the time balance is not greater than zero, or upon expiration of the terminate session timer, instruct the telecommunication network to terminate the communication session, wherein upon expiration of the terminate session timer an end timestamp is written in the CDR; and further comprising the steps of:

upon changing from the first charging parameters to second charging parameters, determining whether there is for the respective user an unconcluded CDR which does not contain an end timestamp;

upon determining that there is an unconcluded CDR for the respective user, setting "now" as a preliminary end timestamp in the unconcluded CDR;

running a time-to-money algorithm to calculate a current cost based on the start timestamp and the preliminary end timestamp in the unconcluded CDR and decreasing the wallet balance by subtracting the calculated current cost; and running the money-to-time algorithm based on the decreased wallet balance and the second charging parameters and updating the terminate session timer accordingly.

8. The system according to claim 7, wherein the communication module is further configured to communicate information to the telecommunication network for displaying the terminate session timer to the respective user.

9. The system according to claim 7, wherein the processing module is further configured to, upon receipt of information from the telecommunication network that the communication session has been terminated, remove the terminate session timer and write an end timestamp in the CDR corresponding to the time lapsed on the terminate session timer.

10. The system according to claim 7, wherein the processing module is further configured to perform the following steps:

upon an increase or decrease of the wallet balance, determine whether there is for the respective user an unconcluded CDR which does not contain an end timestamp; and upon determining that there is an unconcluded CDR for the respective user, run the money-to-time algorithm based on the increased or decreased wallet balance and update the terminate session timer accordingly.

11. The system according to claim 7, wherein the processing module is further configured to perform the following steps:

upon establishment of a communication event relating to the respective user, gather the communication event charge and the wallet balance of the respective user;

determine whether there is for the respective user an unconcluded CDR which does not contain an end timestamp; and upon determining that there is for the respective user an unconcluded CDR, determine whether the communication event may take place based on the wallet balance, the communication event charge and a current cost of the communication session corresponding to the unconcluded CDR.

12. The system according to claim 11, wherein step 12c comprises:

set "now" as a preliminary end timestamp in the unconcluded CDR;

run a time-to-money algorithm to calculate the current cost based on the start timestamp and the preliminary end timestamp in the unconcluded CDR and the first charging parameters; and compare the communication event charge with the wallet balance minus the current cost.

13. A non-transient computer readable medium containing a computer executable software which when executed on a computer system performs the method of claim 1.

* * * * *